Feb. 24, 1959 P. F. WINTERNITZ 2,875,028
PROCESS AND APPARATUS FOR THE FIXATION OF PRODUCTS
OF IRREVERSIBLE THERMOCHEMICAL REACTIONS
Original Filed April 12, 1950 4 Sheets-Sheet 1

INVENTOR
PAUL F. WINTERNITZ
BY
AGENT

United States Patent Office 2,875,028
Patented Feb. 24, 1959

2,875,028

PROCESS AND APPARATUS FOR THE FIXATION OF PRODUCTS OF IRREVERSIBLE THERMOCHEMICAL REACTIONS

Paul F. Winternitz, New York, N. Y., assignor, by mesne assignments, to Thiokol Chemical Corporation, a corporation of Delaware Original application April 12, 1950, Serial No. 155,412. Divided and this application March 26, 1954, Serial No. 418,903

3 Claims. (Cl. 23—288)

The present invention is a division of applicant's co-pending application Serial Number 155,412, now abandoned, filed April 12, 1950, entitled Process and Apparatus for the Fixation of Products of Irreversible Thermochemical Reactions.

The present invention relates to chemical reactions of vapor phase or inhomogeneous type, and in which the reactions are irreversible and take place in steps which usually occur at different rates. It relates more specifically to a process for recovering the products which are formed during such reactions in a desired step, particularly where the reactions are of such a nature that very rapid cooling and a well defined, usually short residence time in the reaction zone are desirable in order that such recovery can be made in substantial yields.

It is an object of this invention to provide means to recover the products which are formed during such reactions in a desired step.

Many chemical reactions are such that they produce certain reaction products which are momentarily present at elevated temperatures but which rapidly decompose or further react into other substances at the reaction temperature or if their temperature is reduced by ordinary cooling methods. This rate of decomposition or further reaction decreases greatly after the temperature has lowered to a certain approximate value, however, so that the initial rate of cooling is very important if substantial yields are to be obtained. It is known that very sudden cooling of such reaction products results in a "freezing" of the reaction so that substances present at the elevated temperature remain in substantial quantities even though the temperature has been lowered. In addition to rapid cooling, the residence time within the reaction zone must be carefully controlled according to the rate of further reaction or decomposition and also according to the specific products which it is desired to collect.

In order that this end may be achieved use is made herein of suitable reactors, as will become evident later, the essential and outstanding feature being the use of a nozzle or nozzles through which the reaction mixtures are passed to control their velocities and temperatures.

It is also an important feature of this invention that means is herein provided to maintain the reaction mixture after it leaves these suitable reactors at a desirable temperature, and to control the velocity of the mixture thereafter.

It is a further object of this invention to provide equipment for collecting and separating the products of these reactions and other reactions of a related type.

Other objects of the present invention will become evident from the discussion and detailed description which follows in this specification.

Although this specification will concern itself with an example of the preparation of boronhydrides from boronhalides, it is not intended that this invention be limited to these particular processes.

Figure 1:
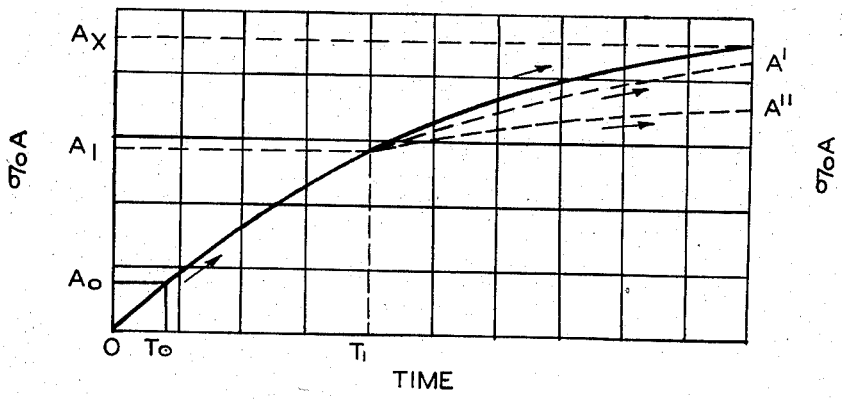
Figure 1 is a curve chart indicating the trend of an irreversible unidirectional thermochemical reaction.

The class of reactions to which the present invention applies comprises those wherein the reaction is unidirectional and stepwise as distinguished from a class of reactions of a reversible nature as discussed in co-pending patent application, Serial Number 155,411, now abandoned, entitled, "Process and Apparatus for the Fixation of Products of Reversible Thermochemical Reactions." The original composition will not be attained again once the reaction has started and the reaction proceeds in one direction until it is completed. An interruption of the reaction will prevent completion. This is shown graphically in Figure 1 where the change in composition at an arbitrarily assumed temperature is plotted against time and at the time $T_1$ the composition $A_1$ has been reached. If the reaction is allowed to proceed undisturbed, the final theoretical composition A will be reached. If the reaction mixture is quenched moderately at the time, when composition $A_1$ has been reached, the reaction will still proceed in the same direction but as the "freezing" temperature is reached a composition somewhere between the composition $A_1$ at the time $T_1$ and the final theoretical composition A will be obtained. The faster the quenching, the closer the actual composition will be to the composition $A_1$ reached at the moment $T_1$.

Figure 2:
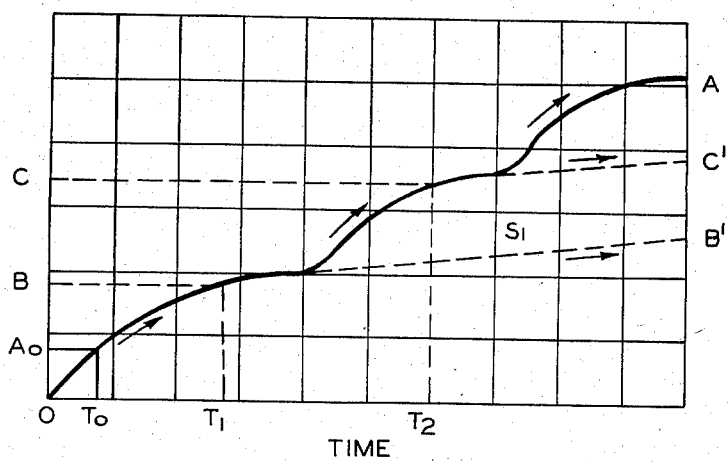
Figure 2 is a curve chart showing a stepwise irreversible unidirectional thermochemical reaction.

In stepwise unidirectional reactions, the progress of the reaction with time is schematically represented in Figure 2. Here the final composition is reached over a number of plateaus, two in the case of Figure 2. Plateau B is reached at approximately the moment $T_1$ and plateau C is reached at approximately the moment $T_2$, the reaction still proceeding only in the direction indicated by the arrows. However, if fast quenching is used at the time $T_1$, the actual final composition may be reached by the path $S_1$ giving the composition $B^1$ which is very close to the composition of the plateau at B. Similarly, by fast quenching at the time $T_2$, the composition $C^1$ may be obtained which is very close to the one at the plateau at C.

It is evident from the foregoing that both the moment and the rate of the quenching effect the composition of the reaction products. The exact moment of quenching is controlled in my invention by the residence time within the reactor, by imparting to the reaction mixture a suitable velocity and, the rate of quenching is controlled by the features of an exhaust nozzle. To those skilled in the art it will be evident that my invention is equally useful for a set of simultaneous reactions, where different intermediates are being formed according to the conditions of the reaction, most of which are of an irreversible nature.

It is well known that boronhydrides such as diborane and pentaborane may be obtained by reacting boronhalides or metaloborofluorides in the presence of certain metals and at elevated temperatures with hydrogen. Similarly, it is possible to obtain boronhydrides by reacting boronhalides with metalhydrides at elevated temperatures. These processes apparently have not been applied to any extent in practice, however, because of the small yields obtained by both methods.

It has been found that at the temperatures necessary for the hydrogenation of boronhalides or metaloborofluorides to boronhydrides, two types of reactions occur simultaneously. These are as follows:

(1) A reaction for which the equation may be written for example:

$$2BX_3 + 3H_2 + 6Me_{(1)} \rightarrow B_2H_6 + 6Me_{(1)}X$$

or $$2Me_{(1)}BX_4 + 3H_2 + 6Me_{(1)} \rightarrow B_2H_6 + 8Me_{(1)}X$$

or $$2BX_3 + 6Me_{(1)}H \rightarrow B_2H_6 + 6MeX$$

where X is written for a halogen atom and $Me_{(1)}$ for a univalent metal.

Simultaneously pentaborane is formed by conversion from diborane.

$$nB_2H_6 \rightarrow mB_5H_9 + \text{higher boronhydrides and hydrogen}$$

(2) A reaction of the type $$a B_2H_6 \xrightarrow{\Delta} b B_xH_y + nH_2 + mB$$

$$c B_5H_9 \xrightarrow{\Delta} d B_uH_v + pH_2 + rB$$

In the first group of reactions shown above, the monovalent metal may be replaced by metals of higher valence, in which case the equations will undergo only a slight change. Also, one, two or all of the reactions described by the equations may take place simultaneously. In the second group of reactions, the terms $B_xH_y$ and $B_uH_v$ respectively indicate boronhydrides containing an indefinite number of boron atoms, which number is, however, higher than five.

It has been found that the first group of reactions take place with a very high velocity at the elevated temperature of from 350° C. (centigrade) to 700° C. which must be used. The decomposition reactions shown above in the second group also proceed at a considerable rate but slower than the first group of reactions, and it is necessary to remove the formed boronhydrides from the reaction as quickly as possible.

The present invention provides means to perform the hydrogenation reaction at the required elevated temperature and yet still prevent the decomposition reaction from taking place to any considerable extent.

To this effect, the reaction mixture, which will usually, but not necessarily, consist of vapors and gases, is passed as a first step through a heated reaction zone at a high velocity, which may vary with the length of the reaction zone and the specific nature of the reaction, and leaves the reaction zone at still higher velocity while simultaneously undergoing very rapid cooling. The reaction zone may or may not as desired contain different materials, which either participate in the reaction or act merely as promoters.

In another step, the products of reaction are slowed down, care being taken to avoid overheating, and are collected by the use of suitable equipment as later described herein.

In order that the necessary velocity may be imparted to the reaction mixture, the reactants are compressed by ordinary methods to appropriate pressures and are then injected into the reaction zone through one or more convergent nozzles or by other means if desired. If such a nozzle or nozzles are used, the additional advantage is obtained that the reactants become thoroughly mixed, while a velocity is imparted to them. If the different components of the reaction mixture are injected by means of separate nozzles, the nozzles may be arranged in various ways so as to cause the emerging jets of the reactants to impinge, thus causing better mixing.

Immediately after they leave the convergent nozzles, the reactants, which may be preheated to aid the reaction, enter the reaction zone at high velocity where they may be further heated in the presence of materials of the type consisting of active substances, such as certain metals and their alloys, or substances participating in the reaction such as metalhydrides or metaloborofluorides. The temperature in the reaction zone, depending upon the desired reaction, is kept between 350° C. and 700° C. while the pressure is maintained within a range from a few atmospheres, but not less than approximately 32 pounds per square inch absolute, to considerable pressures, such as 100 atmospheres or more, again depending upon the desired reaction. The velocity and temperature in the reaction zone are regulated in such a way that maximum hydrogenation takes place but practically no decomposition of the desired compound occurs. The time required for the reactants to pass the reaction zone may take any time from a few thousandths of a second to several seconds after which the reaction products pass into a convergent-divergent nozzle where their velocity is increased because of the convergence, and where they are expanded at supersonic velocity as they pass through the divergent portion of the nozzle. The time required for passage through this nozzle is exceedingly short, in the range from a few microseconds to a few tenths of a second, because of the extremely high velocity acquired by the reaction products while passing through the nozzle. No appreciable change in the composition of the gases occurs during this short period of time but the gases are expanded to some lower pressure, which ordinarily will be atmospheric pressure but may be some multiple or fraction of atmospheric pressure. Simultaneously, the reaction products are cooled to a temperature substantially lower than that prevailing in the reaction zone as they pass through the nozzle and as a result of the expansion, the resultant drop in temperature being easily calculable from the ratio of the pressure at the entrance of the nozzle to that at the exit. The expansion ratio must here be sufficiently great to bring the reaction mixture to a temperature where the equilibrium of the reaction products is frozen, i. e., further reaction does not occur. It is preferred in the present invention to cool the reaction products by this expansion process to a temperature well below this "freezing" level. After the reaction products leave the expansion nozzle, they may be further cooled by injection into the gaseous stream of a quenching fluid such as benzene, kerosene or mercury, the use of water or steam not being possible in the special case of boronhydrides because it would decompose the valuable products of the reaction. These products are cooled down by the process described above to a temperature where no further rapid change in composition takes place, which temperature is for example, in the case of diborane about 150–160° C. or lower. Subsequently, the reactants are gradually slowed down while continuous cooling is applied. They may, for instance, be collected in refrigerated containers, after they have passed properly arranged and cooled baffles, conveniently spaced pebble beds or, preferably, a turbine which will convert the kinetic energy of the reaction products into useful work.

It is emphasized that this second step of deceleration and removal of the kinetic energy of the reaction products is important to the process only for the reason that the local temperature of the reaction gases would rise practically to the temperature of the reaction zone if they should be stopped suddenly by a barrier. Such a rise in temperature would be much faster than any cooling effect, even if the barrier is cooled very sufficiently. It is necessary to avoid this rise in temperature of the reaction mixture to the impact temperature in order to prevent the second group of reactions, the decomposition, from taking place. As previously pointed out, it is preferred that the reaction mixture be cooled well below the temperature where the decomposition reaction is frozen in order to avoid the detrimental effect of a small rise in temperature which might occur even if great care were taken in the deceleration and cooling step.

In the following, a detailed application of the present invention is shown as applied to the production of diborane.

Figure 3:
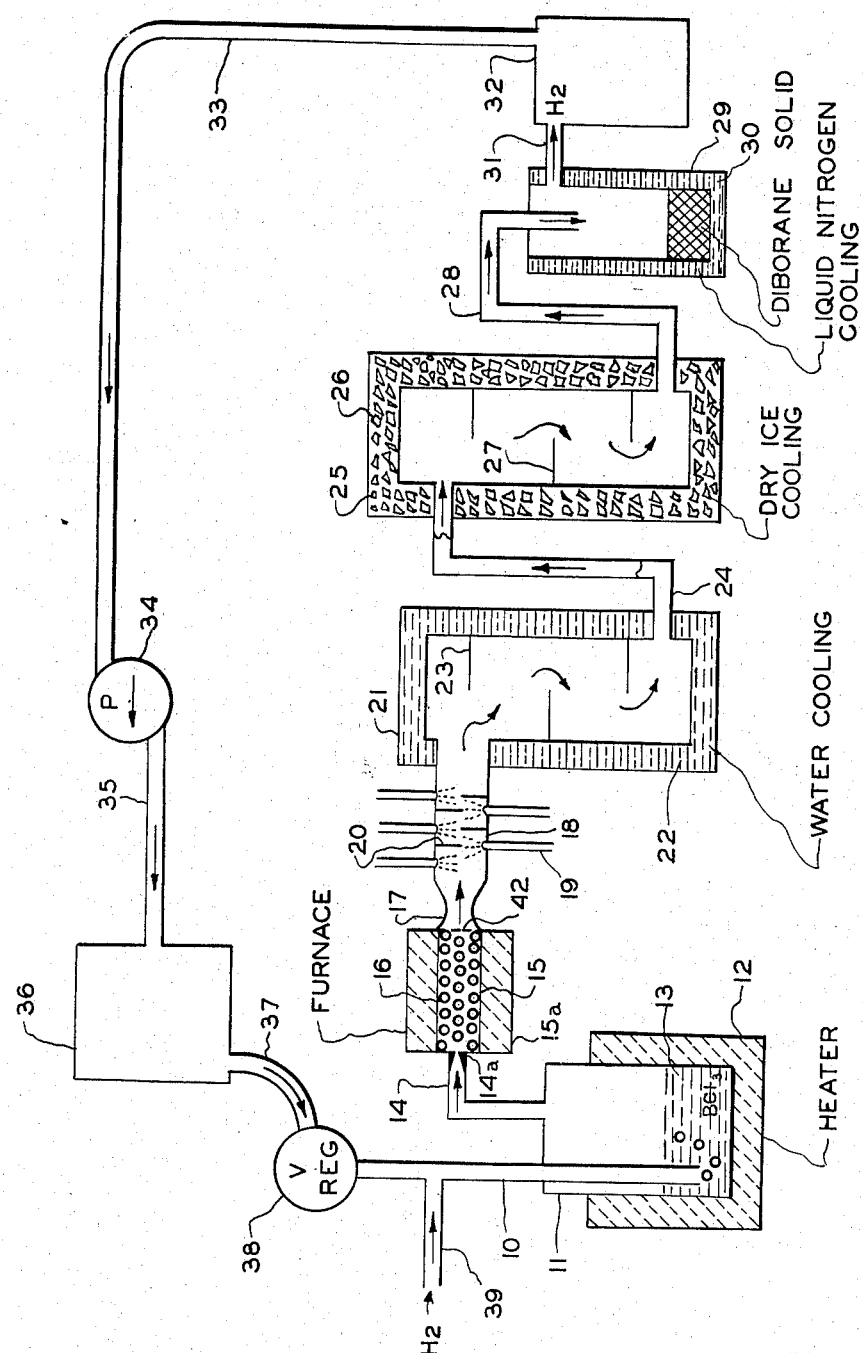
Figure 3 is a schematic diagram of a process for the preparation of diborane.

Reference to Figure 3 shows a container 12 closed at its top by wall 11 and containing a liquid solution 13 of boronchloride, the vapors of which fill container 12. A conduit 10 enters container 12 through wall 11 and extends downward below the surface of solution 13. Hydrogen gas, at a pressure in the range of approximately 5 to 30 atmospheres, is passed through tube 10 into the boronchloride solution 13 where it bubbles to the surface and becomes saturated with boronchloride vapors. At the same time, container 12 and its contents are heated to a temperature in the approximate range of 25° to 150° C. thus aiding this saturation effect. This preheated vapor mixture is then passed through conduit 14, through convergent nozzle 14a where its velocity is increased and into a reaction chamber or reaction zone 15 surrounded by a furnace 15a, where the mixture is heated to a temperature of 375° C. or higher as it passes through this reaction zone, the time of residence within the reaction zone being not longer than ten seconds. The reaction zone, i. e., the interior of furnace 15a is filled with bands 16 of a ceramic material coated with aluminum powder or with granular or finely divided aluminum, which acts as a promoter to aid the reduction. Although aluminum is indicated here, metals of the same group as aluminum, or metals of the same subgroup as copper, or copper alone, can be used. They can also be used together as individual metals or as alloys. As the saturated boronchloride vapor and hydrogen mixture pass over beads 16, a violent and rapid reduction of boronchloride to diborane takes place. At the same time, aluminum chloride is formed, existing as a vapor at this temperature. The reaction mixture then enters directly into a convergent-divergent nozzle 17 through which it passes and where it is rapidly expanded at supersonic velocity to atmospheric pressure, and consequently is suddenly cooled in the time of $1 \times 10^{-2}$ seconds or less to about 160° C. or lower, at which temperature decomposition of diborane takes place only at a moderate rate. After the reaction mixture leaves nozzle 17, which can also be called a quencher, it enters chamber 18 where it is further cooled by the injection of a precooled, saturated hydrocarbon such as kerosene, injected into chamber 18 and the reaction mixture through injector tubes 19, and is slowed by the circuitous path of flow made necessary by baffles 20 which extend into the normal path of the mixture. From chamber 18, the reaction mixture enters water-cooled container 21 where it is further cooled by the water 22 and is further slowed by baffles 23 as it passes through the container. Most of the aluminum chloride is collected in container 21 as is most of the coolant liquid which was injected as the mixture passed through chamber 18. A conduit 24 then carries the reaction mixture into container 25 where it is still further cooled by Dry Ice 26 surrounding container 25, is still further slowed by baffles 27 and the remaining aluminum chloride, unreacted boronchloride, and hydrocarbon coolant are collected. The reaction mixture finally is carried from container 25 through conduit 28 into a trap 29, cooled by liquid nitrogen 30, where the diborane is collected and is separated from the excess hydrogen which leaves trap 39 at exit 31.

By means of the method just described, it is possible to hydrogenate practically all of the boronchloride, while at the same time the aluminum chloride forms a vapor until it is recovered in the condensing containers thus avoiding undesirable clogging of the passages.

It is possible to collect the hydrogen gas remaining at the conclusion of the process and to recycle it. A collection chamber 32 is shown from which this hydrogen gas is carried by conduit 33 to a pump 34 from which it is carried by conduit 35 to a container 36. From container 36, the gas passes through conduit 37 to pressure regulator 38 and is then fed into chamber 12 by means of conduit 10, additional hydrogen gas being added through pipe 39 as needed.

Figure 4:
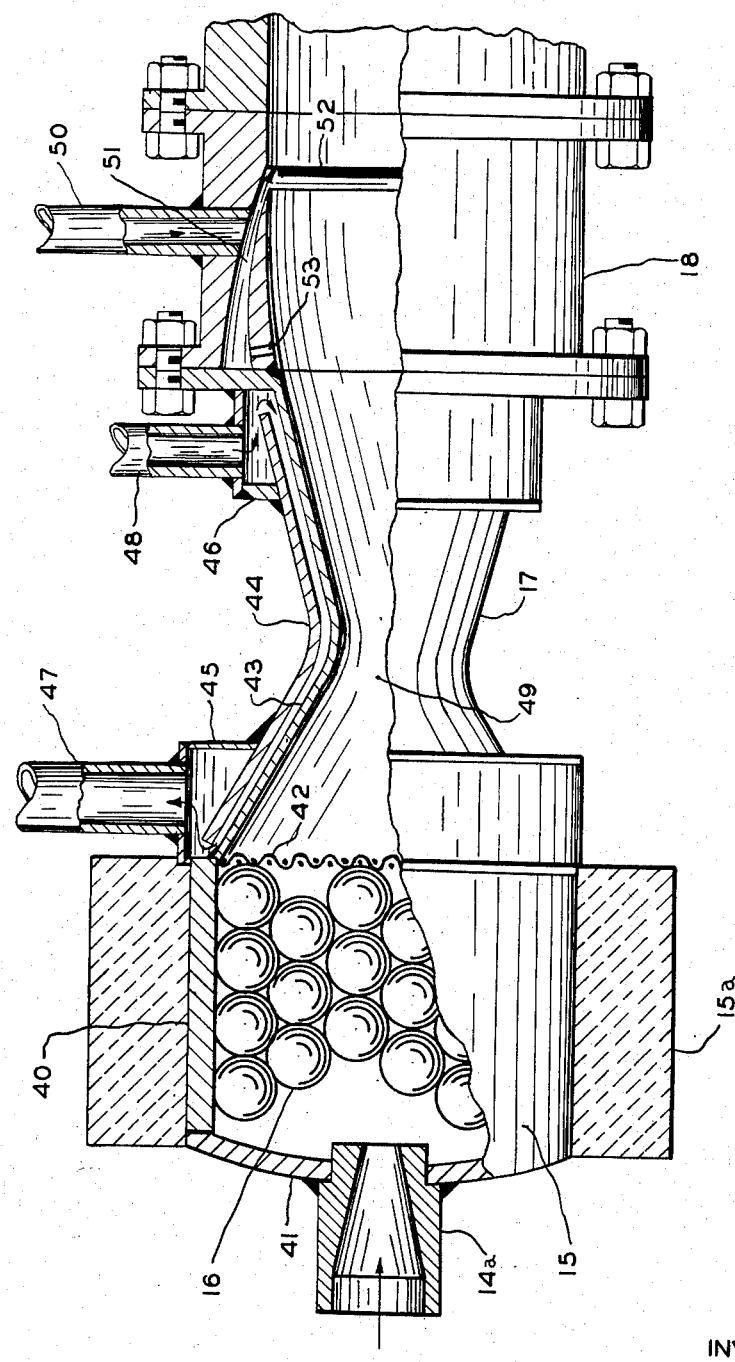
Figure 4 is a cutaway view of the reactor and nozzle utilized in the preparation of diborane.

In Figure 4 is shown an arrangement of the thermochemical reactor and quencher used in the present invention in the described process for the preparation of diborane shown in Figure 3. This reactor and quencher comprises a convergent nozzle 14a, a reactor or reaction chamber 15, and a convergent-divergent nozzle or quencher 17. A receiving chamber 18 is also included in order that the reaction products may be collected and gradually decelerated. Reactor 15 is constructed of a suitable metal, such as iron or steel, with cylindrical side walls 40, head 41 welded to side walls 40, and entrance nozzle 14a welded to head 41 in the manner shown. Inside reactor 15 are ceramic beads 16 coated with aluminum or another promoter as has already been discussed, these being prevented from leaving the reactor by a screen 42. About the periphery of said walls 40 at the opposite end from head 41, is welded nozzle 17 having an inner wall 43, an outer wall 44, and manifolds 45 and 46 attached to its extremities as shown. The space existing between inner wall 43 and outer wall 44 communicates with the interior of manifolds 45 and 46 and their respective coolant pipes 47 and 48 in the manner shown so that a pressurized cooling fluid can be circulated between walls 43 and 44 to cool wall 43. With such an arrangement much thinner material can be used for the nozzle walls than would be possible otherwise. Nozzle 17 gradually decreases in diameter until a constricted throat 49 is reached and then constantly increases in diameter to form a divergent or expansion portion.

At the end of the expansion portion of nozzle 17 is bolted a receiving chamber 18 at which point a hydrocarbon may be injected as previously discussed. This hydrocarbon can be fed through conduit 50 into annular chamber 51 from whence it passes into the stream of reaction products through annular orifice 52 and holes 53.

With proper construction of the equipment described it is also possible to use boronfluoride. Although this yields aluminum fluoride in a solid state, it will leave the reaction zone in the form of a very fine dust if the original aluminum or alloy used in the reaction zone was sufficiently finely divided.

Diborane can also be manufactured from boronhalides and metalhydrides using boronfluoride as an example of a metalhalide and lithiumhydride as an example of a metalhydride without, however, confining the present invention to these specific reagents. In the reaction described below any boronhalide may be used and any metalhydride of the alkali or alkaline-earth group may replace the lithiumhydride. In the example used as an illustration of this new process, boronfluoride is compressed to from 5 to 30 atmospheres, is preheated to a temperature of about 180° C., and is then passed through the reaction zone at such a rate that the residence time within the reaction zone is in the range from 1 to 30 seconds. This reaction zone consists of a tube of ceramic material or of a suitable metal, such as iron, which is kept at a temperature of 180° C. or higher. The reaction zone is filled with finely divided lithiumhydride, which has been precipitated out of an ether slurry on ceramic beads, or alternatively with a coarse lithiumhydride powder. A violent reaction occurs and the boronfluoride is converted virtually quantitatively to boronhydride, while at the same time lithiumfluoride is being formed. The diborane, with some fine dust of lithiumfluoride, enters the convergent-divergent nozzle, where its velocity is increased and then it is expanded at high velocity in a period of $1 \times 10^{-2}$ seconds or less to atmospheric pressure, whereby the temperature is lowered to 120° C. or lower at which temperature decomposition of diborane takes place only at a moderate rate. The reaction mixture is then slowed down in large containers equipped with water-cooled baffles, where the bulk of the entrained lithiumfluoride settles out. From there it enters receivers cooled with Dry Ice where small amounts of higher boronhydrides are separated from the diborane, and finally a trap cooled with liquid nitrogen, where the diborane is collected. If necessary, separation of unreacted boronfluoride, which may also have condensed in the liquid nitrogen receiver, can be accomplished by absorption of the boronfluoride in ethylether, whereby the high boiling boronfluoride etherate is formed, whereas diborane is only slightly soluble in ethylether. By the process described above, up to 95% of the boronfluoride used can be converted into diborane, whereas the yield is less than half of this amount without the step of adiabatic expansion and sudden cooling, because of the decomposition of diborane at the high reaction temperatures.

As previously stated, a metaloborofluoride can be used in place of a boronhalide in the processes of preparing diborane. In this case the boronhalide is replaced by the boronfluoride, which is developed by the decomposition of the metaloborofluoride. The same procedure and conditions of temperature are applicable as described for the boronhalides, with some changes necessitated by the fact that the boronhalides are used in the gaseous state, whereas the metaloborofluorides are introduced into the reaction zone as solids. The cation in the metaloborofluorides should belong to the group of the alkali or alkaline-earth metals.

Figure 5:
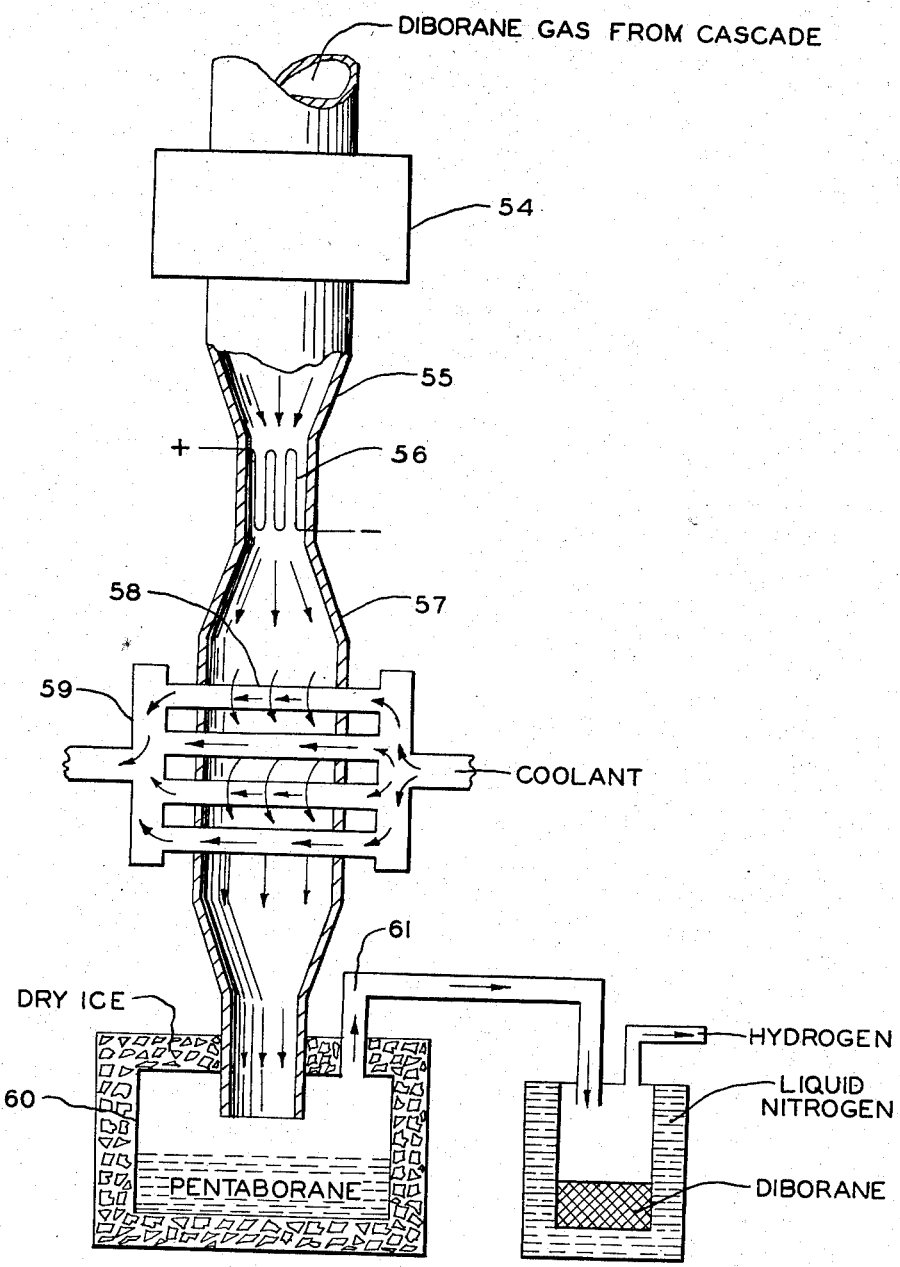
Figure 5 is a schematic diagram of a process for the preparation of pentaborane.

At high temperatures, diborane is converted partially into pentaborane. This conversion, however, involves a complicated set of reactions as a result of which many undesirable by-products are formed. It is known that high pressures and a temperature as high as can be used without causing secondary decomposition of pentaborane is desirable. The present invention therefore utilizes the arrangement previously described for the production of diborane, with increases in pressures and temperatures, to produce pentaborane either by conversion from diborane or directly by hydrogenation of boronhalides. The pressures to be applied are of the order from 100 to 2000 atmospheres and the temperatures are in the range from 400 to 700° C. After expansion, in this process, a reaction mixture is collected which contains, besides the cooling liquid, substantial amounts of pentaborane together with hydrogen, higher boronhydrides and diborane, and in the case of direct hydrogenation also of metalhalides. The reaction mixture is decelerated and cooled down as previously described, the number of different steps being chosen so as to separate the different components. Unreacted hydrogen and diborane can be recycled into the process. The arrangement being used in the conversion process of diborane to pentaborane is described below and is shown in Figure 5.

Diborane gas is stored in a cascade at pressures as needed for operations described below, which pressures may range from pressures in excess of 25 atmospheres to pressures in excess of 150 atmospheres. The diborane gas is released from this cascade through a pressure regulating device 54 and enters the convergent portion of the nozzle 55 at a constant pressure which is higher than 25 atmospheres, preferably as high as 150 atmospheres, and while passing through the nozzle is accelerated to a high velocity, which may be regulated by the dimension of said convergent nozzle so as to adjust the velocity of the gases to the dimensions and the temperature of the reaction zone. The latter temperature is kept at 300° C. or higher by means of electric heating elements 56. The residence time in the reaction zone may vary, the maximum residence time being limited by the side reactions, however, it has been found that an increase in temperatures accelerates the desired reaction in preference to undesirable side-reactions. After it passes the reaction zone, the reaction mixture is expanded by means of the expansion portion 57 of the nozzle, and by this step is cooled sufficiently fast so that the reaction mixture is within the temperature range for only a very short period of time during which these side reactions become important. The time required for passing the expansion nozzle 57, and therefore also this temperature range, may be as short as $1 \times 10^{-5}$ seconds, but any expansion which is less by a factor of 100 than the residence time in the reactor is suitable. As pointed out before, it is preferable to use pressures of about 150 atmospheres and temperatures of about 300° C. In this case the sudden drop in temperature will occur within about $1 \times 10^{-5}$ seconds and the temperature of the reaction mixture will be decreased to about 0° C. However, a sudden decrease in temperature to below 150° C. is sufficient for the present purpose provided the reaction mixture is cooled down slowly further to ambient temperatures in the manner described later. Sudden cooling is necessary in this process in order to reduce the loss of the diborane which is converted at intermediate temperatures and low pressure partially into undesirable by-products. After they leave the expansion nozzle 57, the gases which are then moving with a high velocity are decelerated by impingement on properly arranged baffles 58, which at the same time form part of an efficient heat exchanger 59. In this way the reaction mixture is brought virtually to rest while it is being cooled down simultaneously to about 0° to 10° C. This step is important for the reason that an increase in temperature brought about by impact on the walls of the heat exchanger may be great enough to cause undesirable side reactions to take place.

During this step partial condensation of the pentaborane takes place and it is preferred therefore, to arrange the whole equipment in such a way that the condensed pentaborane flows by gravity into collector 60, the reaction products proceeding from the zone where they are decelerated and cooled by baffles 58 and heat exchanger 59 to collector 60, which is kept at the temperature of Dry Ice. Here the pentaborane and higher boronhydrides are condensed, while unreacted diborane and hydrogen formed during the reaction leave collector 60 at 61 and are subsequently separated in the receiver vessel 62, which is cooled with liquid nitrogen. Unreacted diborane is returned into the cascade after the operation has been completed. Some solid boronhydrides are also formed during the reaction, and they are collected in separate traps which are not shown in the drawing. The mixture of pentaborane and higher boronhydrides collected in collector 60 is separated in the usual way by fractional distillation.

It has been stated earlier in this specification that the present invention is not limited to the production of boronhydrides but may be applied to any process involving two or more concurrent reactions, one or more of which differs from the others at a given temperature in the rate at which it or they take place. The present invention gives the means to recover the products of a particular reaction, which may be chosen among those occurring at the faster or slower rate. In order to achieve this, it is only necessary to adjust the residence time in the reaction zone and the quenching rate while passing through the nozzle to the rate of the desired reaction at the chosen temperature.

The present invention is well suited to the controlled oxidation of hydrocarbons where many reactions take place concurrently and where it is desirable to recover intermediate products of partial oxidation.

While there have been shown and described and pointed out the fundamental and novel features of this invention as applied to a specific process and apparatus therefore, it will be understood that various omissions and substitutions and changes in the form and details of the process and apparatus illustrated and in its operation may be made by those skilled in the art without departing from the spirit of the invention. It is the intention therefore to be limited only as indicated by the scope of the following claims.

What is claimed is:

1. A thermochemical reactor and quencher comprising a convergent entrance nozzle, an enclosed reaction chamber attached to and in communication therewith, a furnace substantially surrounding said reaction chamber, an exit nozzle attached to said reaction chamber and in communication therewith said exit nozzle being convergent from its point of communication with said reaction chamber to a constricted throat and divergent thereafter, outer and inner walls for said nozzle, means for circulating fluid coolant therebetween, a cooling chamber attached to the divergent portion of said nozzle, a catalyst contained in the reaction chamber, means for producing gaseous reactant under pressure, conduit means connecting said gas producing means with said entrance nozzle, and a trap communicably connected to the cooling chamber for the collection of the reaction product.

2. A thermochemical reactor and quencher comprising a convergent entrance nozzle, an enclosed reaction chamber attached to and in communication therewith, a furnace substantially surrounding said reaction chamber, an exit nozzle attached to said reaction chamber and in communication therewith, said exit nozzle being convergent from its point of communication with said reaction chamber to a constricted throat and divergent thereafter, outer and inner walls for said nozzle, means for circulating fluid coolant therebetween, a cooling chamber attached to the divergent portion of said nozzle and having a wall, an orifice in the wall of said chamber, means for flowing a liquid coolant through said orifice into said chamber, a catalyst contained in the reaction chamber, means for producing gaseous reactant under pressure, conduit means connecting said gas producing means with said entrance nozzle, and a trap communicably connected to the cooling chamber for the collection of the reaction product.

3. The invention set forth in claim 2 with the orifice being annular in form.

References Cited in the file of this patent
UNITED STATES PATENTS

| | | |
|---|---|---|
| 1,202,040 | Ellis | Oct. 24, 1916 |
| 1,689,667 | Free | Oct. 30, 1928 |
| 1,795,037 | Portail | Mar. 3, 1931 |
| 2,438,242 | Watson | Mar. 23, 1948 |

FOREIGN PATENTS

| | | |
|---|---|---|
| 254,966 | Great Britain | July 15, 1926 |
| 271,899 | Great Britain | Aug. 18, 1927 |
| 425,348 | Italy | Sept. 24, 1947 |